US012619499B2

(12) United States Patent
Yadav et al.

(10) Patent No.: US 12,619,499 B2
(45) Date of Patent: May 5, 2026

(54) LEVERAGING FILE-SYSTEM CAPABILITIES FOR ENHANCING BACKUP AND RESTORE VALIDATION

(71) Applicant: Dell Products L.P., Round Rock, TX (US)

(72) Inventors: Sunil Yadav, Bengaluru (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,423

(22) Filed: Jul. 26, 2024

(65) Prior Publication Data

US 2026/0030113 A1     Jan. 29, 2026

(51) Int. Cl.
*G06F 11/14*          (2006.01)
*G06F 11/1446*       (2026.01)

(52) U.S. Cl.
CPC ...... *G06F 11/1448* (2013.01); *G06F 11/1435* (2013.01); *G06F 11/1458* (2013.01)

(58) Field of Classification Search
CPC ............. G06F 11/1448; G06F 11/1435; G06F 11/1458
See application file for complete search history.

(56) References Cited

U.S. PATENT DOCUMENTS

| | | | |
|---|---|---|---|
| 8,732,479 | B1 | 5/2014 | Henriksen |
| 9,026,499 | B1 | 5/2015 | Rajimwale et al. |
| 9,940,460 | B1 | 4/2018 | Derbeko et al. |
| 11,256,574 | B1 | 2/2022 | Reddy et al. |
| 12,210,416 | B1 | 1/2025 | Yadav et al. |
| 2018/0018218 | A1 | 1/2018 | Rat et al. |
| 2019/0250991 | A1 | 8/2019 | Lee et al. |
| 2020/0104216 | A1 | 4/2020 | Wang et al. |
| 2021/0117542 | A1* | 4/2021 | Bastide ................. G06F 21/565 |
| 2021/0303413 | A1 | 9/2021 | Chopra et al. |
| 2022/0043717 | A1* | 2/2022 | Yadav ................. G06F 11/1458 |
| 2022/0092184 | A1* | 3/2022 | Trim .................... G06F 21/565 |
| 2022/0358215 | A1 | 11/2022 | Shachar et al. |
| 2022/0398170 | A1 | 12/2022 | Yadav et al. |
| 2023/0205636 | A1* | 6/2023 | Yadav ................. G06F 11/1456 |
| | | | 707/640 |
| 2024/0028720 | A1 | 1/2024 | Luniya |
| 2024/0103984 | A1* | 3/2024 | Yadav ................. G06F 11/1469 |
| 2024/0111633 | A1* | 4/2024 | Yadav ................. G06F 11/1461 |

\* cited by examiner

*Primary Examiner* — Bryce P Bonzo
*Assistant Examiner* — Xinyuan Yu
(74) *Attorney, Agent, or Firm* — Chamberlain, Hrdlicka, White, Williams & Aughtry; Aly Z. Dossa

(57) ABSTRACT

A method for efficient backup and recovery validation includes receiving, as part of a backup operation for a host and at a backup storage, a backup copy from the host; retrieving a metadata database from the backup copy, where the metadata database includes a host checksum value based on a portion of the backup copy; parsing, using a backup agent, the metadata database by appending the metadata database with a backup checksum value based on the portion of the backup copy; making a first determination, using the backup agent, whether the portion of the backup copy is abnormal based on a comparison between the host checksum value and the backup checksum value; and appending, based on the first determination, the metadata database with a recoverable identifier to generate a recovery metadata database, where the recoverable identifier causes an adjustment to a recovery operation.

18 Claims, 7 Drawing Sheets

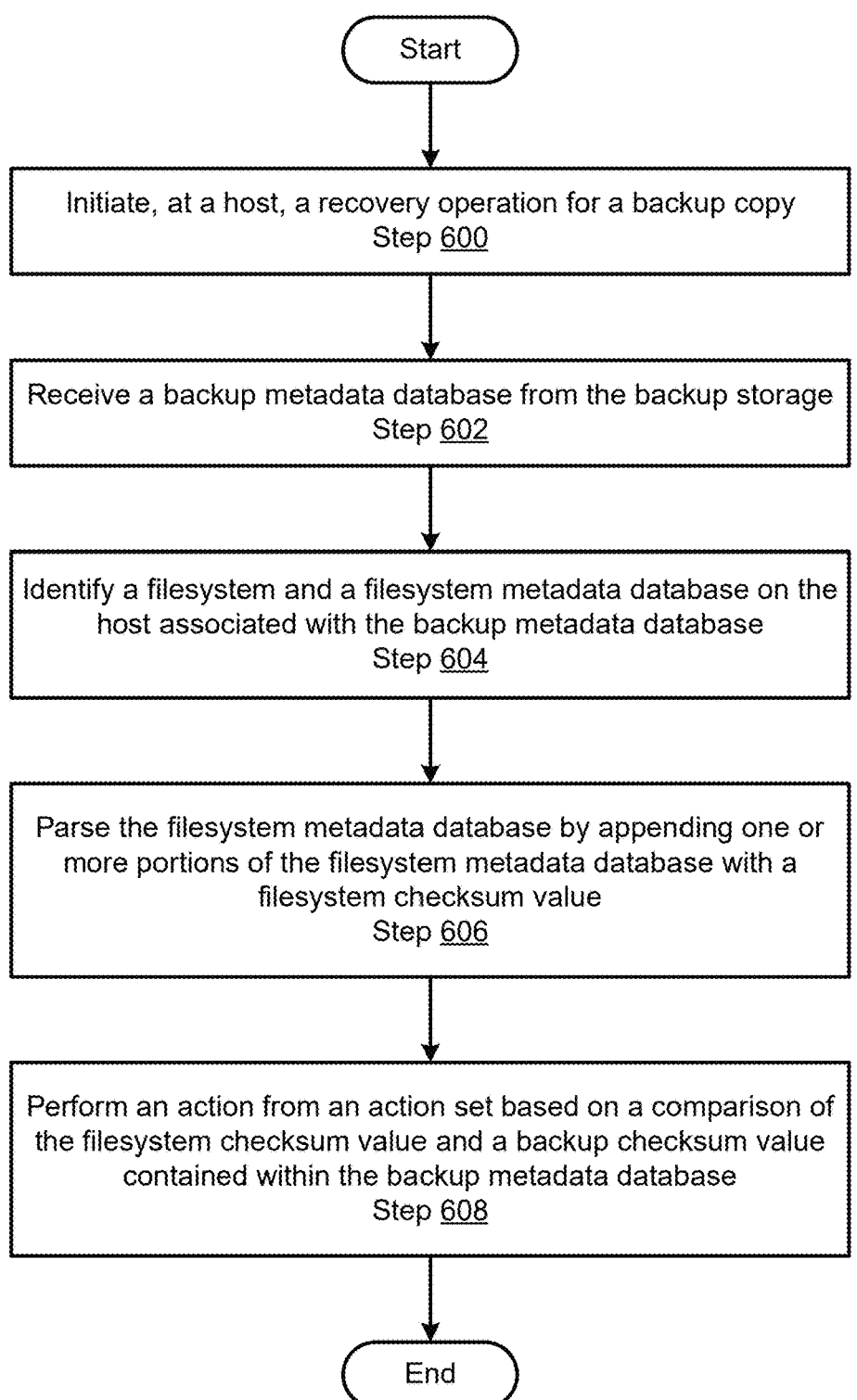

Start

Initiate, at a host, a recovery operation for a backup copy
Step 600

Receive a backup metadata database from the backup storage
Step 602

Identify a filesystem and a filesystem metadata database on the host associated with the backup metadata database
Step 604

Parse the filesystem metadata database by appending one or more portions of the filesystem metadata database with a filesystem checksum value
Step 606

Perform an action from an action set based on a comparison of the filesystem checksum value and a backup checksum value contained within the backup metadata database
Step 608

End

LEVERAGING FILE-SYSTEM CAPABILITIES FOR ENHANCING BACKUP AND RESTORE VALIDATION

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

SUMMARY

In general, in one aspect, embodiments described herein relate to a method for efficient backup and recovery validation, the method including receiving, as part of a backup operation for a host and at a backup storage, a backup copy from the host. The method also includes retrieving a metadata database from the backup copy, where the metadata database includes a host checksum value based on a portion of the backup copy. The method further includes parsing, using a backup agent, the metadata database by appending the metadata database with a backup checksum value based on the portion of the backup copy. In addition, the method includes making a first determination, using the backup agent, whether the portion of the backup copy is abnormal based on a comparison between the host checksum value and the backup checksum value. Moreover, the method includes appending, based on the first determination, the metadata database with a recoverable identifier to generate a recovery metadata database, where the recoverable identifier causes an adjustment to a recovery operation.

In general, in one aspect, embodiments described herein relate to a method for efficient backup and recovery validation, the method including initiating a backup operation for a host and identifying, in response to the initiating, a first filesystem that is subject to the backup operation. The method also includes retrieving first filesystem metadata associated with the first filesystem and appending a portion of the first filesystem metadata associated with a portion of the first filesystem with a first host checksum value based on the portion of the first filesystem to generate a backup-ready metadata database. In addition, the method includes providing the backup-ready metadata database to a backup storage as part of completing the backup operation. Moreover, the method includes, after completing the backup operation: initiating a recovery operation for the host, receiving, after the initiating and from the backup storage, a backup metadata database, identifying a second filesystem associated with the backup metadata database, retrieving second filesystem metadata associated with the second filesystem, making a first comparison, for a first portion of the second filesystem, between a second host checksum value contained within the second filesystem metadata and a backup checksum value contained within the backup metadata database, and making an adjustment, based on the first comparison, to the recovery operation.

In general, in one aspect, embodiments described herein relate to a non-transitory computer readable medium (CRM). The non-transitory CRM includes computer readable program code, which when executed by a computer processor, enables the computer processor to perform a method for efficient file-based backups and recoveries. The method includes receiving, as part of a backup operation for a host and at a backup storage, a backup copy from the host. The method also includes retrieving a metadata database from the backup copy, where the metadata database includes a host checksum value based on a portion of the backup copy. The method further includes parsing, using a backup agent, the metadata database by appending the metadata database with a backup checksum value based on the portion of the backup copy. In addition, the method includes making a first determination, using the backup agent, whether the portion of the backup copy is abnormal based on a comparison between the host checksum value and the backup checksum value. Moreover, the method includes appending, based on the first determination, the metadata database with a recoverable identifier to generate a recovery metadata database, where the recoverable identifier causes an adjustment to a recovery operation.

Other aspects of the embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

FIG. 6 shows a flowchart of a method for performing a recovery operation in accordance with one or more embodiments disclosed herein.

DETAILED DESCRIPTION

Figure 1:
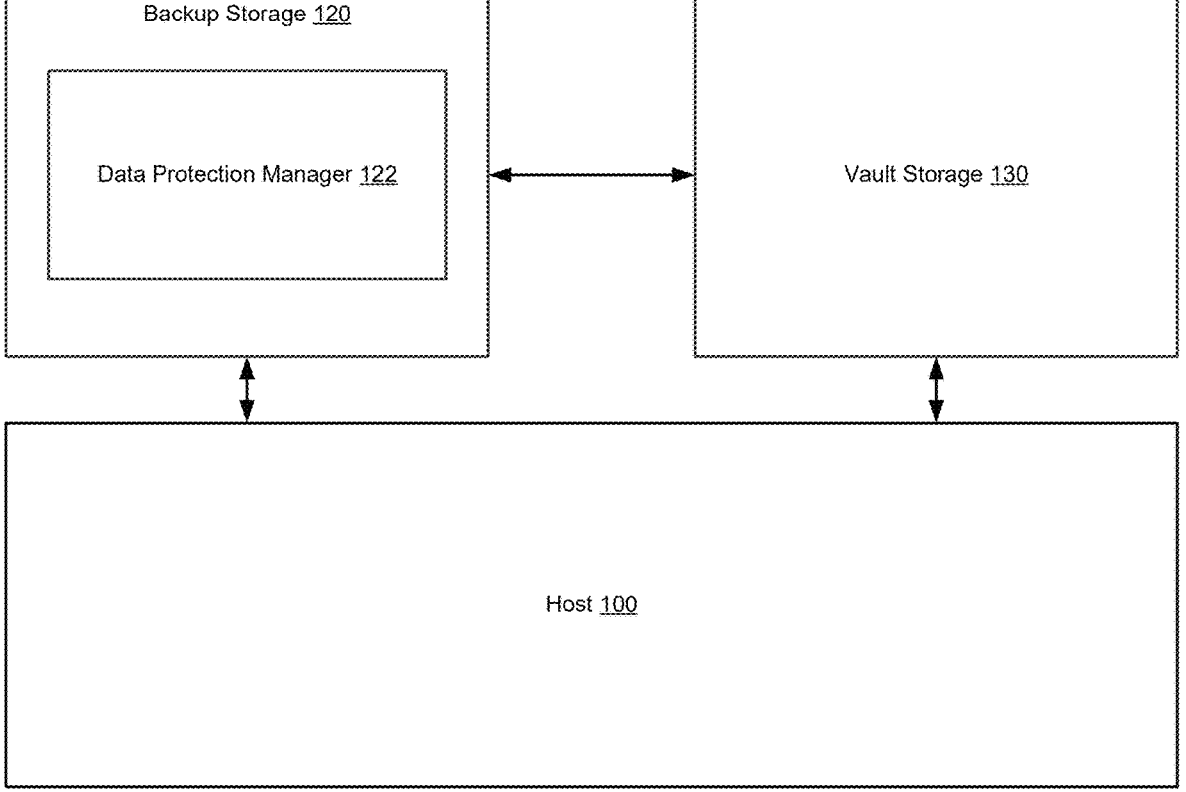
FIG. 1 shows a diagram of a system in accordance with one or more embodiments disclosed herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to leveraging file-system capabilities for enhancing backup and recovery validation operations. Particularly, after a file-system is backed up using a file-based technique, a validation agent performs a validation operation on the backup copy. Often, this validation process consumes a large number of resources, such as computing resources and time, to fully perform. Embodiments described herein employ file-system data integrity capabilities to efficiently conduct file-based backup and recovery operations, where said capabilities rely on low-cost metadata operations that convert expensive physical IO operations (e.g., reads and/or writes) to quick and logical equivalents. This allows backup and recovery operations to complete faster and generate less IO to the underlying storage, which, in turn, results in the reduction of resource consumption (e.g., compute processing, network bandwidth, backup target storage utilization, etc.).

FIG. 1 shows a diagram a system in accordance with one or more embodiments disclosed herein. The system may include a host (100), a backup storage (120), and a vault storage (130). The components of the system illustrated in FIG. 1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1 is discussed below.

In one or more embodiments, the host (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the host (100) described herein and/or all, or a portion, of the methods illustrated in FIGS. 4-6. The host (100) may be implemented using other types of computing devices without departing from the embodiments disclosed herein. For additional details regarding computing devices, refer to FIG. 7.

The host (100) may be implemented using logical devices without departing from the embodiments disclosed herein. For example, the host (100) may include VMs that utilize computing resources of any number of physical computing devices to provide the functionality of the host (100). The host (100) may be implemented using other types of logical devices without departing from the embodiments disclosed herein.

In one or more embodiments, the host (100) may include the functionality to, or otherwise be programmed or configured to, perform computer implemented services for users of the host (100). The computer implemented services may include electronic mail communication services, database services, calendar services, inferencing services, and/or word processing services. The computer implemented services may include other and/or additional types of services without departing from embodiments disclosed herein. The host (100) may also include the functionality to perform local data protection services. The local data protection services may include generating backups, generating backup metadata, providing backup images and backup metadata to the backup storage (120), and performing backup and recovery operations in conjunction with the backup storage (120) and/or the vault storage (130). The local data protection services may include other and/or additional services without departing from embodiments disclosed herein. The host (100) may include the functionality to perform all, or a portion of, the methods discussed in FIGS. 4-6. The host (100) may include other and/or additional functionalities without departing from embodiments disclosed herein. For additional information regarding the host, refer to FIG. 2.

In one or more embodiments, the backup storage (120) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (120) described herein and/or all, or a portion, of the methods illustrated in FIGS.

4-6. The backup storage (120) may be implemented using other types of computing devices without departing from the embodiments disclosed herein. For additional details regarding computing devices, refer to FIG. 7.

The backup storage (120) may be implemented using logical devices without departing from the embodiments disclosed herein. For example, the backup storage (120) may include virtual machines that utilize computing resources of any number of physical computing devices to provide the functionality of the backup storage (120). The backup storage (120) may be implemented using other types of logical devices without departing from the embodiments disclosed herein.

In one or more embodiments, the backup storage (120) may include the functionality to, or otherwise be programmed or configured to, obtain and store backups generated on the host (100). The backup storage (120) may also include the functionality to provide all, or a portion, of the backups stored on the backup storage (120) to the host (100) for recovery operations, perform cyber recovery operations on backup images, and/or provide backup images to the vault storage (130). The backup storage (120) may include the functionality to perform all, or a portion, of the methods discussed in FIGS. 4-6. The backup storage (120) may include other and/or additional functionalities without departing from embodiments disclosed herein.

In one or more embodiments disclosed herein, the backup storage (120) may include one or more backup storages. The backup storage (120) may include any quantity of backup storages without departing from embodiments disclosed herein. In one or more embodiments, a backup storage of the backup storage (120) may include a backup storage type. The backup storage (120) may include any quantity and/or combination of backup storage types without departing from embodiments disclosed herein. Each backup storage type may be associated with a particular backup storage format or backup storage functionality. A backup storage type may include, a block-based backup storage, a file system-based backup storage, and/or an object-based backup storage. A block-based backup storages may store backups as one or more data blocks. A file system-based backup storage may store backups as one or more files and/or folders. An object-based backup storage may store backups as one or more objects. Other and/or additional types of backup storages may be included in the backup storage (120) without departing from embodiments disclosed herein.

In one or more embodiments, the data protection manager (122) may be included as part of the backup storage (120), as a standalone device, and/or as a distributed device. In one or more embodiments, the data protection manager (122) is implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 4-6. The data protection manager (122) may be implemented using other types of computing devices without departing from embodiments disclosed herein. For additional details regarding computing devices, refer to FIG. 7.

In one or more embodiments, the data protection manager (122) may be implemented using logical devices without departing from embodiments disclosed herein. For example, the data protection manager (122) may include virtual machines that utilize computing resources of any number of physical computing devices to provide the functionality of the data protection manager (122). The data protection manager (122) may be implemented using other types of logical devices without departing from the embodiments disclosed herein.

In one or more embodiments, the data protection manager (122) may include the functionality to, or may be otherwise programmed or configured to, perform data protection management services for the data generated on the host (100). The data protection management services may include: (i) initiating the performance of data protection services by a data protection agent (discussed below) executing on the host based on user requests and/or protection policies, (ii) maintaining backup metadata associated with backups and/or data included within the backups, (iii) performing cyber recovery operations on backup images, and (iv) performing recovery operations to recover backups from the backup storage (120) and/or the vault storage (130) to the host (100).

The data protection management services may include other and/or additional services without departing from embodiments disclosed herein. The data protection manager (122) may include the functionality to perform all, or a portion of, the methods of FIGS. 4-6. The data protection manager (122) may include other and/or additional functionalities without departing from embodiments disclosed herein. For additional information regarding the data protection manager (122), refer to FIG. 3.

In one or more embodiments, the vault storage (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (120) described herein and/or all, or a portion, of the methods illustrated in FIGS. 4-6. The vault storage (130) may be implemented using other types of computing devices without departing from the embodiments disclosed herein. For additional details regarding computing devices, refer to FIG. 7.

The vault storage (130) may be implemented using logical devices without departing from the embodiments disclosed herein. For example, the vault storage (130) may include virtual machines that utilize computing resources of any number of physical computing devices to provide the functionality of the vault storage (130). The vault storage (130) may be implemented using other types of logical devices without departing from the embodiments disclosed herein.

In one or more embodiments, the vault storage (130) may include the functionality to, or otherwise be programmed or configured to, obtain and store backups from the backup storage (120). For example, the vault storage (130) may be utilized as a long-term, secure, and/or reliable storage system that has less functionality than the backup storage (120). The vault storage (130) may include the functionality to perform all, or a portion, of the methods discussed in FIGS. 4-6. The vault storage (130) may include other and/or additional functionalities without departing from embodiments disclosed herein.

In one or more embodiments disclosed herein, the vault storage (130) may include one or more backup storages. The vault storage (130) may include any quantity of backup storages without departing from embodiments disclosed herein. In one or more embodiments, a backup storage of the vault storage (130) may include a backup storage type. The vault storage (130) may include any quantity and/or combination of backup storage types without departing from embodiments disclosed herein. Each backup storage type may be associated with a particular backup storage format or backup storage functionality. A backup storage type may include, a block-based backup storage, a file system-based backup storage, and/or an object-based backup storage. A block-based backup storages may store backups as one or more data blocks. A file system-based backup storage may store backups as one or more files and/or folders. An object-based backup storage may store backups as one or more objects. Other and/or additional types of backup storages may be included in the vault storage (130) without departing from embodiments disclosed herein.

Although the system of FIG. 1 is shown as having a certain number of components (e.g., 100, 120, 130), in other embodiments disclosed herein, the system may have more or fewer components. For example, the functionality of each component described above may be split across components or combined into a single component. Further still, each component may be utilized multiple times to carry out an iterative operation.

Figure 2:
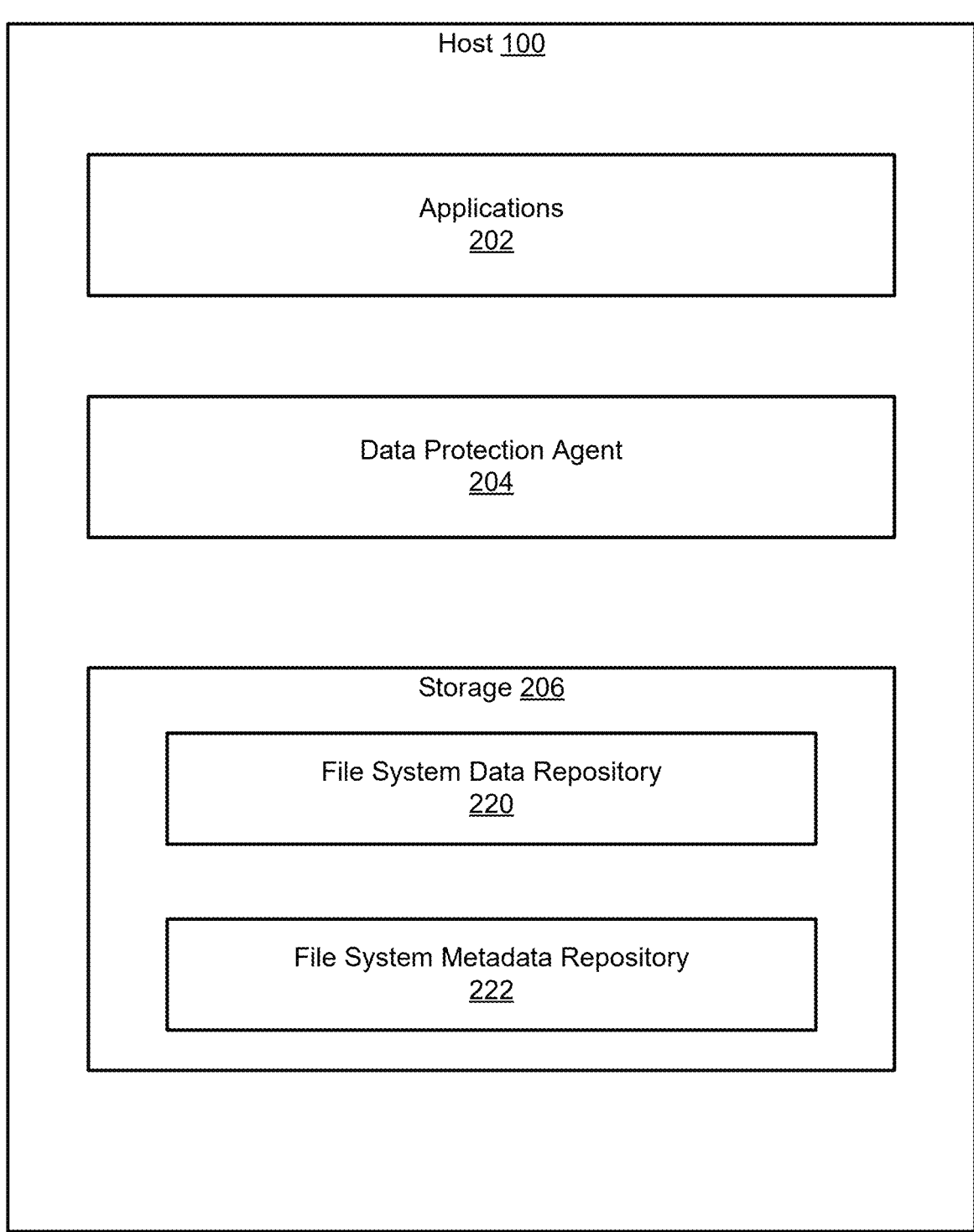
FIG. 2 shows a diagram of a host in accordance with one or more embodiments disclosed herein.

FIG. 2 shows a diagram of a host in accordance with one or more embodiments disclosed herein. The host (100) may be an embodiment of the host (100, FIG. 1A) discussed above. As discussed above, the host (100) may include the functionality to perform computer implemented services and local data protection services. To perform the aforementioned services, the host (100) may include applications (202), a data protection agent (204), and storage (206). The host (100) may include other, additional, and/or fewer components without departing from embodiments disclosed herein. For example, the host may include multiple data protection agents if multiple applications require distinct backup generation functionalities. As yet another example, the host may include multiple virtual machines. Each of the aforementioned components of the host (100) is discussed below.

In one or more embodiments disclosed herein, the host also includes one or more virtual machines that are implemented as computer instructions, e.g., computer code, stored on a storage (e.g., 206) that when executed by a processor of the host (100) causes the host (100) to provide the functionality of the virtual machine. The virtual machine may include the functionality to perform or otherwise provide computer implemented services to users. The virtual machine may include other and/or additional functionalities without departing from embodiments disclosed herein. The virtual machine may be managed by a hypervisor (e.g., computing instructions executing on the host (100)). For example, the hypervisor may be a Hyper-V hypervisor. The hypervisor may generate image backups (full and incremental) of VMs executing on the host (100).

In one or more embodiments, the applications (202) are included on the host, and may further be included within a virtual machine. Each of the applications (202) may be a portion of the computer instructions discussed above, which when executed by a processor of the host (100), causes the host (100) to perform a portion of the computer implemented services performed by the application (202). For example, a database application may perform database services, a word processing application may perform word processing services, and an electronic mail communication application may perform electronic mail communication services, etc.

In one or more embodiments disclosed herein, the data protection agent (204) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection agent (204) described throughout this Detailed Description.

In one or more embodiments disclosed herein, the data protection agent (204) is implemented as computer instructions, e.g., computer code, stored on a storage (e.g., 108) that when executed by a processor of the host (100) causes the host (100) to provide the functionality of the data protection agent (204) described throughout this Detailed Description.

In one or more embodiments disclosed herein, the data protection agent (204) is implemented using one or more external computing devices. Although such an implementation is not shown in the systems of FIG. 1 or FIG. 2, the one or more computing devices may be operatively connected to the host (100) enabling the data protection agent (204) to remotely interact with the host (100). For additional information regarding computing devices, refer to the discussion above with respect to FIG. 1 or the discussion below with respect to FIG. 7.

In one or more embodiments, the data protection agent (204) may include the functionality to perform the aforementioned local data protection services of the host (100). To perform the local data protection services, the data protection agent (204) may obtain requests and information from the data protection manager (122, FIG. 1) and send and respond to commands between the backup storage (120, FIG. 1), the vault storage (130), the host (100), and the applications (202). The sending and responding to the commands may result in the performance of all, or a portion, of the methods discussed in FIGS. 4-6. The commands may be associated with an Internet Protocol, such as, for example, Internet Small Computer Systems Interface (iSCSI). For additional information regarding the functionality of the data protection agent (204), refer to FIGS. 4-6.

In one or more embodiments, the storage (206) may be implemented using one or more volatile or non-volatile storages or any combination thereof. The storage (206) may include the functionality to, or otherwise be configured to, store and provide all, or portions, of information that may be used by the applications (202), and/or the data protection agent (204). The information stored in the storage (206) may include a file system data repository (220) and a file system metadata repository (222). The storage may include other and/or additional information without departing from embodiments disclosed herein. Each of the aforementioned types of information is discussed below.

In one or more embodiments disclosed herein, the applications (202) and/or users of the applications (202) generate data during the performance of computer implemented services. The data may be stored in a file system. In one or more embodiments disclosed herein, a file system is an organizational data structure that tracks how application data is stored and retrieved in a system (e.g., in storage (206) of the host (100), i.e., the file system data repository (220)). The file system may specify references to assets of applications and any asset data associated with each asset. An asset may be an individual data object in the file system. An asset may be, for example, an application (202), a portion of the file system, or the entirety of the file system. Each asset may include any number of elements (e.g., sub-assets). The elements may be, for example, snapshots, backup images, folders and/or files associated with an application (e.g., 202) or the host (100). Each file may include file data. The file data may include, for example, database data, calendar data, electronic mail communications data, etc.

In one or more embodiments, the file system data repository (220) may include one or more data structures that may be used to generate backups. The file system data repository (220) may include file data generated by the applications (202) and/or users of the applications (202) as discussed above. The file data may be any type of data such as database data and email data generated by users of the applications (202) without departing from the embodiments disclosed herein. Each asset (e.g., applications (202) or file system) may be associated with any number of sub-assets (e.g., files, snapshots, backup images, folders, etc.), each sub-asset may include any quantity of file data, and furthermore, each asset may include any number of elements without departing from embodiments disclosed herein. Users and/or applications (202) may use the file data of the file system data repository (220) when obtaining computer implemented services from the host (100). Additionally, the file data (e.g., backup-ready metadata) of the file system data repository (220) may be obtained and/or modified by the data protection agent (204) to generate backups, as described in further detail below in FIG. 4. The file data of the file system data repository (220) may be used by other and/or additional entities for other and/or additional purposes without departing from embodiments disclosed herein. Additionally, the file system data repository (220) may include other and/or additional types of information without departing from embodiments disclosed herein.

In one or more embodiments, the file system metadata repository (222) may include one or more data structures that include information regarding files included in the file system stored in the file system data repository (220). The information may include, for example, an entry for each file that includes: file identifiers associated with the file, the file length or size, one or more data runs associated with one or more data blocks of the file, data block identifiers associated with the one or more data blocks of the file, the creation date, the modification date, the asset identifier associated with the file, a parent file or folder associated with the file, a file system checksum value, a backup checksum value, and a recoverable identifier. The file system metadata repository (222) may include other and/or additional information associated with the files stored in the file system data repository (220) (as discussed below in FIGS. 4-6) without departing from embodiments disclosed herein. The file system metadata repository (222) may be used by the users of the applications (202) and/or the data protection agent (204) during the performance of computer implemented services. The file system metadata repository (222) may be used by the data protection agent (204) to generate backups and backup metadata, as discussed below. The information included in the file system metadata repository (222) may be generated by the applications (202), the host operating system, and/or users of the applications (202) during the performance of computer implemented services and stored in the file system metadata repository (222).

While the above data structures (e.g., 220, 222) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (206), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 3:
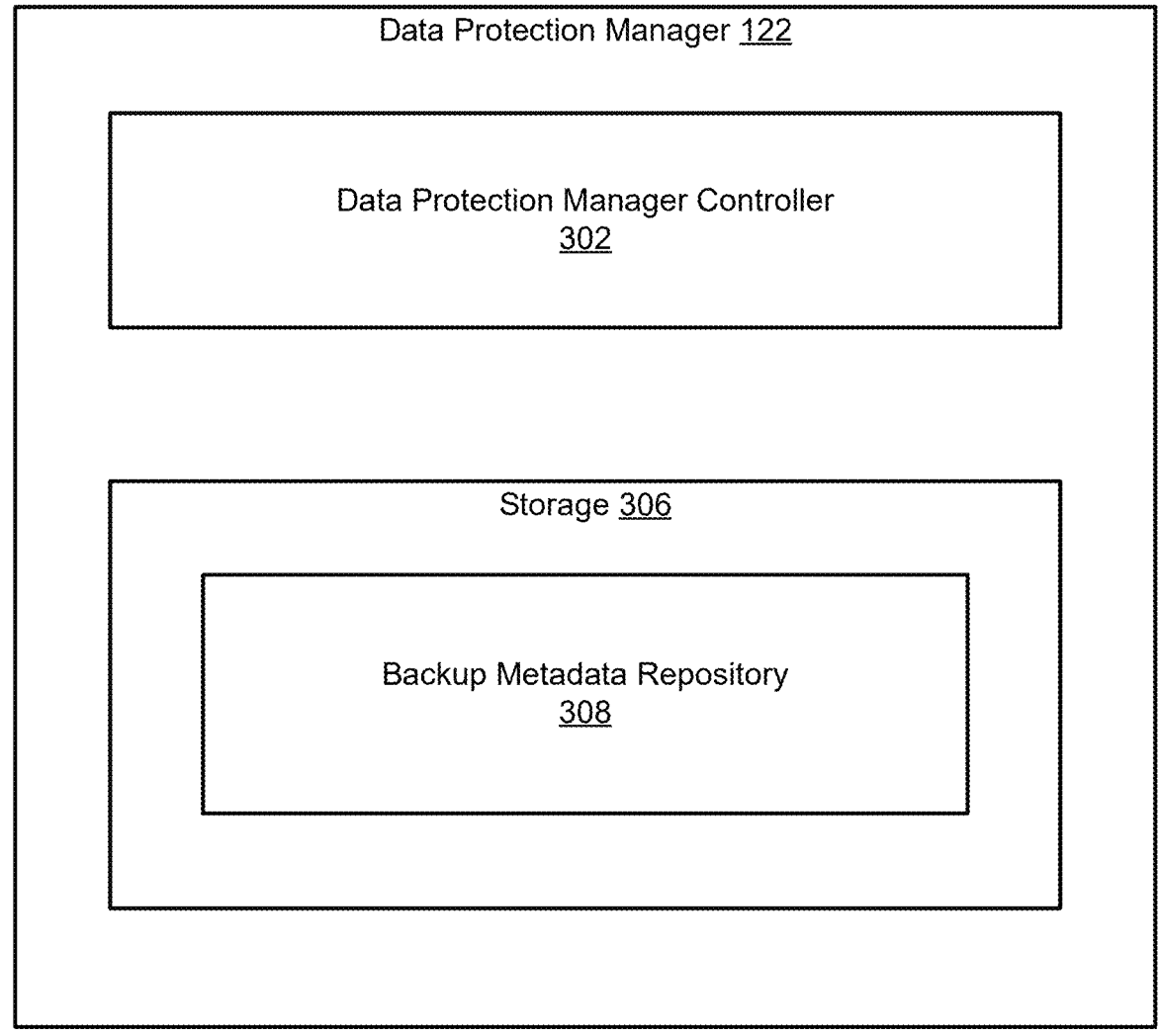
FIG. 3 shows a diagram of a data protection manager in accordance with one or more embodiments disclosed herein.

FIG. 3 shows a diagram of a data protection manager in accordance with one or more embodiments disclosed herein. The data protection manager (122) may be an embodiment of the data protection manager (122, FIG. 1 and/or 204, FIG. 2) discussed above. As discussed above, the data protection manager (122) may include the functionality to perform data protection management services. To perform the aforementioned services, the data protection manager (122) may include a data protection manager controller (302) and storage (306). The data protection manager (122) may include other, additional, and/or fewer components without departing from embodiments disclosed herein. Each of the aforementioned components of the data protection manager (122) is discussed below.

In one or more embodiments disclosed herein, the data protection manager controller (302) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection manager controller (302) described throughout this Detailed Description.

In one or more embodiments disclosed herein, the data protection manager controller (302) is implemented as computer instructions, e.g., computer code, stored on a storage (e.g., 306) that when executed by a processor of the data protection manager (122) causes the data protection manager (122) to provide the functionality of the data protection manager controller (302) described throughout this Detailed Description.

In one or more embodiments, the data protection manager controller (302) may include the functionality to perform the aforementioned data protection management services. To perform the data protection management services, the data protection manager controller (302) may send requests and information to the data protection agent (204, FIG. 2) to initiate the generation of backups and backup access services. The data protection manager controller (302) may perform all, or a portion, of the methods discussed in FIGS. 4-6. For additional information regarding the functionality of the data protection manager controller (302), refer to FIGS. 4-6.

In one or more embodiments, the storage (306) may be implemented using one or more volatile or non-volatile storages or any combination thereof. The storage (306) may include the functionality to, or otherwise be configured to, store and provide all, or portions, of information that may be used by users of the system and the data protection agent (204, FIG. 2) to perform backup access services and/or other data protection services without departing from embodiments disclosed herein. The information stored in the storage (306) may include a backup metadata repository (308).

The storage (306) may include other and/or additional information without departing from embodiments disclosed herein.

In one or more embodiments, the backup metadata repository (308) may include one or more data structures that include information regarding backups of the data generated on the host (100, FIG. 1). The information may include, for example, for each backup, a backup identifier, a backup generation timestamp, and a storage location included in the backup storage. The information may also include, for each file/asset in a backup: a file identifier associated with the file, a file name associated with the file, the file length or size, data runs, the asset identifier associated with the file, a parent file or folder associated with the file, a host checksum value, a backup checksum value, and a recoverable identifier. The information may further include application information associated with the backups such as an application identifier, an application name, and an application type (e.g., database application, a word processing application, etc.). The backup metadata repository (308) may include a backup-ready metadata database (discussed below in FIGS. 4-6) that includes any of the above-discussed metadata from the host that is associated with a backup received from the host.

The backup metadata repository (308) may include other and/or additional information associated with backups of the data generated on the host (100, FIG. 1) without departing from embodiments disclosed herein. The backup metadata repository (308) may be used by the data protection agent (204, FIG. 2) during the performance of backup access services. The information included in the backup metadata repository (308) may be generated by the data protection agent (204, FIG. 2) during the backup generation and backup access services and stored in the backup metadata repository (308).

While the data structures and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (306), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 4:
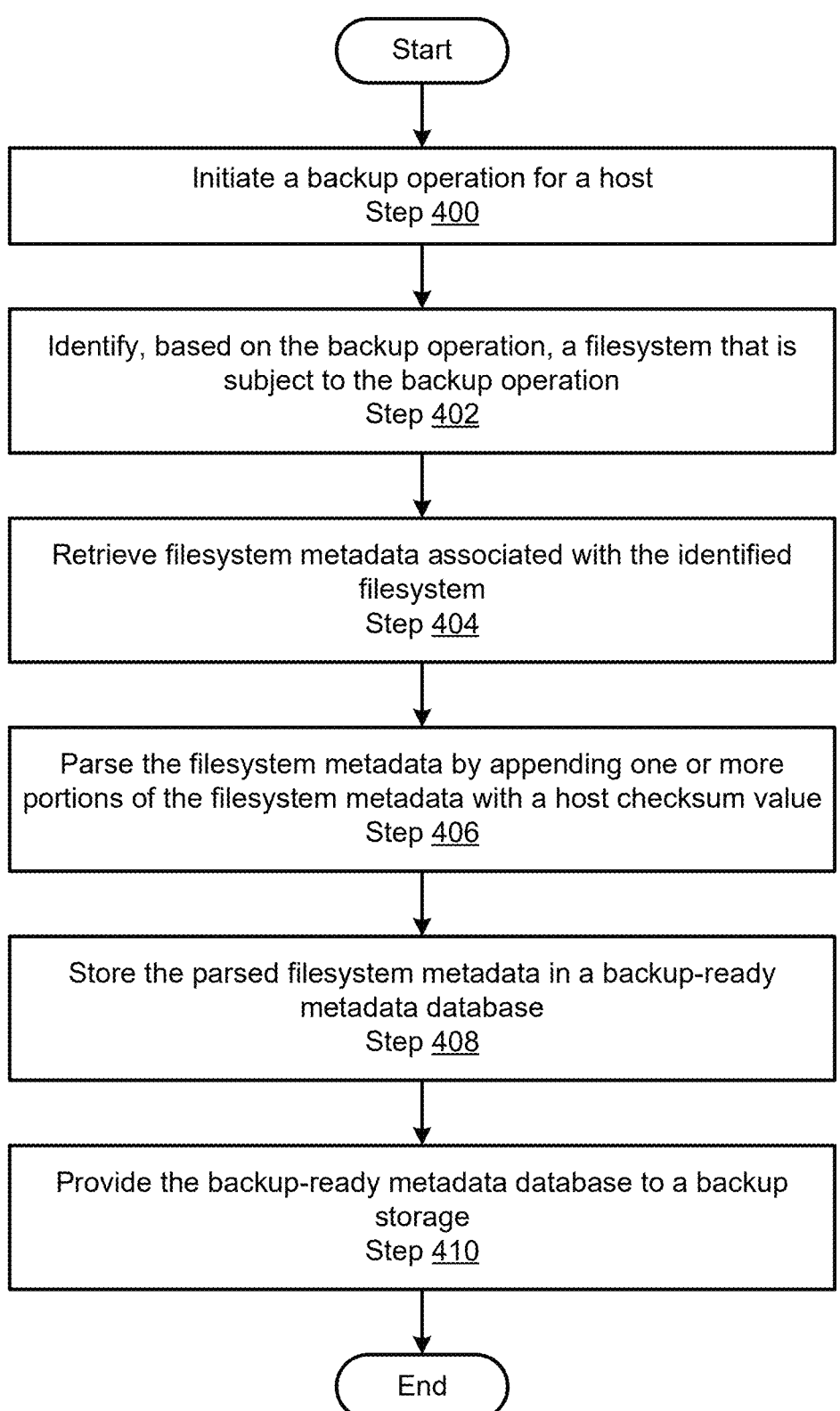
FIG. 4 shows a flowchart of a method for generating backup-ready metadata on a host in accordance with one or more embodiments disclosed herein.

FIG. 4 shows a flowchart of a method for monitoring applications and data usage within a virtual machine to generate metadata usable to logically split a backup image of the virtual machine. The method shown in FIG. 4 may be performed by, for example, a data protection agent (e.g., 204, FIG. 2). Other components of the system in FIGS. 1-3 may perform all, or a portion, of the method of FIG. 4 without departing from the scope of the embodiments described herein. While FIG. 4 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 400, the data protection agent initiates or receives a request to initiate a backup operation for a host (e.g., 100, FIG. 2). In one or more embodiments, the backup operation includes a type of backup being performed (e.g., file-based, block-based, metadata-based, snapshot, full, incremental, etc.) and which files and/or filesystems are subject to the backup operation. In one or more embodiments, the request includes backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. The request may be provided to the data protection agent using any appropriate method of data transmission without departing from embodiments disclosed herein. For example, the data protection manager may transmit the request as a message that includes one or more network packets through one or more network devices that operatively connect the data protection agent to the data protection manager.

In Step 402, the data protection agent identifies, based on the backup operation, a filesystem that is subject to the backup operation. In one or more embodiments, the identification is based on the information contained within a backup request, as described above. In one or more embodiments, the identification is based on a certain schedule/policy (e.g., the data protection agent is initiating the backup because a schedule/policy indicates that it is time to backup a certain filesystem).

In Step 404, the data protection agent retrieves filesystem metadata associated with the identified filesystem. In one or more embodiments, the file includes a file called a master file table (MFT) (e.g., filesystem metadata). For every asset (e.g., file) of the file system, the file system metadata includes at least one component (e.g., one entry) that specifies information of an asset.

In Step 406, the data protection agent or the filesystem itself parses the filesystem metadata by appending portions of the filesystem metadata with a host checksum value. In one or more embodiments, the filesystem includes functionality to perform checksum at an asset level and append the metadata associated with that asset with the host checksum value. Utilizing the functionality of the filesystem itself may be a more efficient way to analyze the filesystem metadata. In one or more embodiments, the host checksum value is a number string associated with a set of data (e.g., a file, a block, or other grouping of data) that acts like a unique fingerprint for the set of data such that any differences (or a threshold amount of differences) in the set of data would produce a different checksum value. Thus, the checksum may be used to quickly compare sets of data to determine whether the sets of data are the same or not without having to fully compare each set of data. Further, different methods can be employed that would each provide a different checksum value for the same set of data. As such, in one or more embodiments, the host checksum value also includes the specific methodology used to generate the host checksum value.

In Step 408, the data protection agent stores the parsed filesystem metadata in a backup-ready metadata database. In one or more embodiments, the data protection agent generates a metadata database for the backup to provide metadata relating to the backup and also includes the filesystem metadata that was parsed in Step 406 in this backup-ready metadata database. In one or more embodiments, the data protection agent removes some of the information contained within the filesystem metadata before storing it in the backup-ready metadata database, which may reduce the size and increase the performance of operations performed using the backup-ready metadata database.

In Step 410, the data protection agent provides the backup-ready metadata database to the backup storage as part of providing a backup to the backup storage. In one or more embodiments, as part of the providing, a backup of the filesystem subject to the backup operation is generated in accordance with the type of backup specified. In one or more embodiments, the data protection agent may use any appropriate backup generation technique without departing from embodiments disclosed herein. The backup may be stored locally within a storage of the host. The backup may be reflected in the file system data and file system metadata of the host.

In one or more embodiment, the method ends following Step 410.

Figure 5:
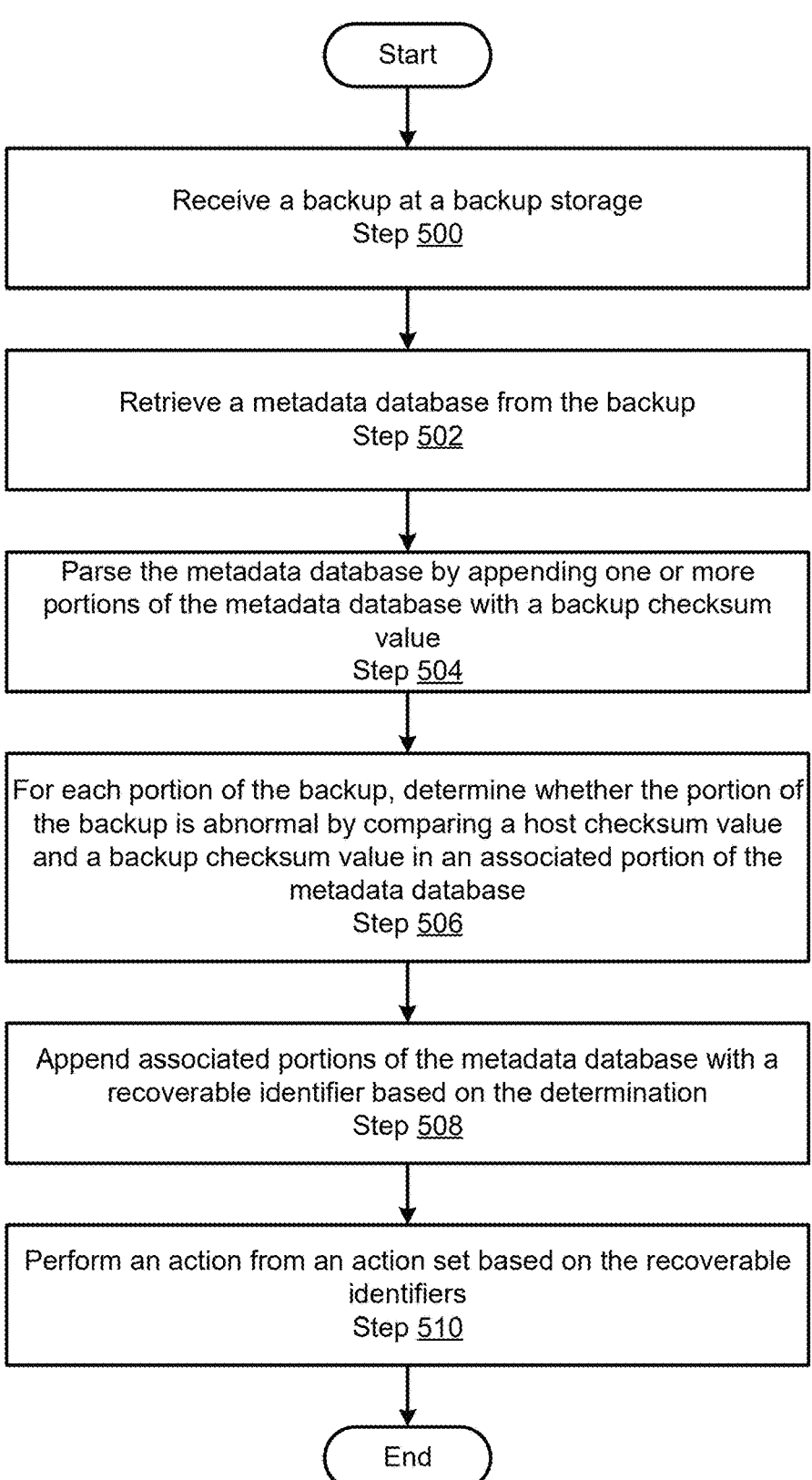
FIG. 5 shows a flowchart of a method for validating a backup in accordance with one or more embodiments disclosed herein.

FIG. 5 shows a flowchart of a method for performing a cyber recovery operation on a filesystem backup in accordance with one or more embodiments disclosed herein. The method shown in FIG. 5 may be performed by, for example, a data protection manager (e.g., 122, FIG. 3). Other components of the system in FIGS. 1-3 may perform all, or a portion, of the method of FIG. 5 without departing from the scope of the embodiments described herein. While FIG. 5 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 500, the data protection manager receives a backup at a backup storage, which may include receiving the backup provided in Step 410 above. In addition, the backup includes a backup of the filesystem, which may be in a file-based backup format or a block-based backup format, and a metadata database, which may include the backup-ready metadata database discussed in FIG. 4. In Step 502, the data protection manager retrieves the metadata database from the backup.

In Step 504, the data protection manager parses the metadata database by appending one or more portions of the metadata database with a backup checksum value. In one or more embodiments, the filesystem includes functionality to perform checksum at an asset level and append the metadata associated with that asset with the backup checksum value. Utilizing the functionality of the filesystem itself may be a more efficient way to analyze the filesystem metadata.

In one or more embodiments, the backup checksum value is a number string associated with a set of data (e.g., a file, a block, or other grouping of data) that acts like a unique fingerprint for the set of data such that any differences (or a threshold amount of differences) in the set of data would produce a different checksum value. In one or more embodiments, the set of data is based on the type of backup performed to generate the backup. For example, for a file-based backup, each checksum value is associated with a file and, for a block-based backup, each checksum value is associated with a block of data.

In one or more embodiments, prior to determining the backup checksum value, the data protection manager identifies the methodology used to generate the host checksum value contained within the metadata database and ensures that the methodology used to generate the backup checksum value is the same. After the backup checksum values are generated and appended to the metadata database in this Step 504, each set of data includes, at least, a host checksum value and a backup checksum value in its associated metadata.

In Step 506, for each portion of the backup (e.g., each set of data discussed above), the data protection manager determines whether the portion of the backup is abnormal by comparing the host checksum value and the backup checksum value in the associated portion of the metadata database. In one or more embodiments, the filesystem includes functionality to perform this comparison and determination. Utilizing the functionality of the filesystem itself may be a more efficient way to analyze the filesystem metadata.

In Step 508, the data protection manager appends associated portions of the metadata databased with a recoverable identifier based on the determination made in Step 506. In one or more embodiments, the filesystem includes functionality to perform this comparison and determination. Utilizing the functionality of the filesystem itself may be a more efficient way to analyze the filesystem metadata.

As discussed above, each checksum value acts like a unique fingerprint for the associated set of data. As such, a comparison between the host checksum value and the backup checksum value compares whether any changes have been made to the associated set of data between the time the host checksum value was generated (e.g., on the host during or before the generation of the backup) and the backup checksum value was generated (e.g., after the backup has been transferred to the backup storage). If the host checksum value and the backup checksum value do not match, then that indicates that the associated data has changed in the interim and should be marked as having been changed. In such a scenario, the recoverable identifier could include an abnormal identifier, a non-recoverable identifier, a further analysis required identifier, or some other identifier that generally indicates that the host checksum value and the backup checksum value do not match. Conversely, if the host checksum value and the backup checksum do match, then the recoverable identifier includes a normal identifier that indicates that the associated set of data was successfully passed on to the backup storage and is in condition to be used for recovery purposes.

In Step 510, the data protection manager performs an action from an action set based on the recoverable identifiers. In one or more embodiments, the action set includes: (i) sending a message to a user (e.g., via a graphical user interface) that indicated whether any sets of data were found to have non-matching host and backup checksum values and may also include a list of the sets of data; (ii) sending the sets of data associated with matching host and backup checksum values to a vault storage (e.g., 130, FIG. 1); (iii) sending sets of data associated with non-matching host and backup checksum values for further analysis; (iv) generating a score card for the backup that is based on a percentage of the total size or file counts of sets of data that were found to have matching host and backup checksum values; (v) sending a request to the host to initiate a backup for the sets of data that were found to have non-matching host and backup checksum values; and/or (vi) removing sets of data associated with non-matching host and backup checksum values from the backup to ensure that those sets of data are not used for recovery purposes.

In one or more embodiments, the method ends following Step 510.

In one or more embodiments, a backup is a past version of the same filesystem that is already present on the host and a recovery operation is being utilized to return the filesystem to a previous point-in-time. Some of the data contained on the current version of the filesystem already located on the host may be the same as the data contained on the backup and thus the backup provides no changes to those unchanged portions of the filesystem. As such, it would be more efficient to not perform a recovery operation for those unchanged portions of the filesystem, and only perform the recovery operation for those portions of the filesystem that have changed from the backup to the current version located on the host. The method in FIG. 6 below provides an efficient process to check whether portions of the filesystem have changed and then only perform the recovery operation on the changed portions of the filesystem, thereby drastically decreasing the time and resources consumed to perform a recovery operation of a filesystem.

FIG. 6 shows a flowchart of a method for performing a recovery operation in accordance with one or more embodiments disclosed herein. The method shown in FIG. 6 may be performed by, for example, a data protection agent (e.g., 204, FIG. 2). Other components of the system in FIGS. 1-3 may perform all, or a portion, of the method of FIG. 6 without departing from the scope of the embodiments described herein. While FIG. 6 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 600, the data protection agent sends a request to the data protection manager (e.g., 122, FIG. 3) to initiate a recovery operation of a filesystem on a host (e.g., 100, FIG. 2). The recovery request may include one or more backup identifiers, a host identifier, and/or a filesystem identifier to enable the specific backup being requested to be identified by the data protection manager.

In Step 602, the data protection agent and/or the host receives a backup metadata database associated with the backup from a backup storage and/or the data protection manager. The backup metadata database may be the same as the metadata database discussed in FIG. 5 above, which also provides more information on the sourcing and modifications made to the backup and metadata database.

In Step 604, the data protection agent identifies a filesystem and a filesystem metadata database associated with the backup and the backup metadata database. As discussed above, the backup may be a past version of the same filesystem that is already present on the host and a recovery operation is being utilized to return the filesystem to a previous point-in-time. Some of the data contained on the current version of the filesystem already located on the host may be the same as the data contained on the backup and thus the backup would provide no changes to those unchanged portions of the filesystem.

In Step 606, the data protection agent or the filesystem itself parses the filesystem metadata database by appending portions of the filesystem metadata database with a filesystem checksum value. In one or more embodiments, the filesystem includes functionality to perform checksum at an asset level and append the metadata associated with that asset with the host checksum value. In one or more embodiments, the filesystem checksum value is appended to the backup metadata database in addition to or instead of to the filesystem metadata database.

In Step 608, the data protection agent performs an action from an action set based on a comparison of the filesystem checksum value and the backup checksum value.

In one or more embodiments, if the filesystem checksum value and the backup checksum value do match, then that indicates that no changes have been made to the associated set of data from the time the backup was generated until the time the recovery operation was initiated. In such a scenario, the action includes skipping/not performing the portion of the recovery operation associated with the associated set of data. In one or more embodiments, the skipping also includes sending a message to the backup storage that the associated portion of the backup should not be sent to the host, which may further reduce the amount of resources consumed by the recovery operation. In one or more embodiments, the skipping also includes not sending a message to the backup storage, which would cause the entirety of the backup to be sent to the host, and the data protection agent does not utilize/perform the recovery operation for the associated set of data.

In one or more embodiments, if the filesystem checksum value and the backup checksum value do not match, then that indicates that changes have been made to the associated set of data from the time the backup was generated until the time the recovery operation was initiated. In such a scenario, the data protection agent performs the recovery operation as normal, which may include sending a request to the backup storage for the associated set of data and performing the recovery operation for that associated set of data.

For each checksum value, the actions in Step 608 may be performed iteratively, in batches, in parallel streams, or in any other grouping without departing from the embodiments disclosed herein.

In one or more embodiments, the method ends following Step 608.

Figure 7:
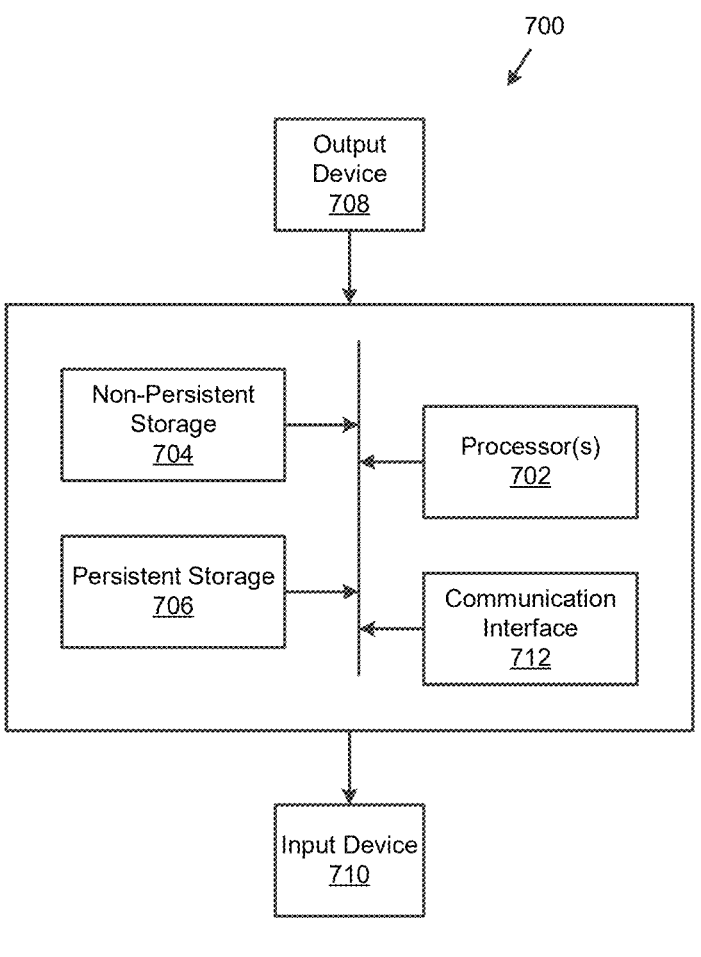
FIG. 7 shows a diagram of a computing device in accordance with one or more embodiments disclosed herein.

FIG. 7 shows an exemplary computing system in accordance with one or more embodiments described herein. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one or many embodiment(s) described herein, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one or many embodiment(s) described herein, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s)

(702), non-persistent storage (704), and persistent storage (706). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the embodiments described herein have been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for efficient backup and recovery validation, the method comprising:

receiving, as part of a backup operation for a host and at a backup storage, a backup copy from the host;

retrieving a metadata database from the backup copy, wherein the metadata database comprises a host checksum value based on a portion of the backup copy;

parsing, using a backup agent, the metadata database by appending the metadata database with a backup checksum value based on the portion of the backup copy, wherein the host checksum value and the backup checksum value are generated using an integrity stream feature of a filesystem associated with the backup copy;

making a first determination, using the backup agent, whether the portion of the backup copy is abnormal based on a comparison between the host checksum value and the backup checksum value; and appending, based on the first determination, the metadata database with a recoverable identifier to generate a recovery metadata database, wherein the recoverable identifier causes an adjustment to a recovery operation.

2. The method of claim 1, wherein the recoverable identifier is a normal identifier, and wherein when the recoverable identifier is the normal identifier the method further comprises:

receiving, from a second host, a request to initiate the recovery operation using the backup copy; and providing, to the second host, the recovery metadata database, wherein the recovery metadata database is usable to:

identify a portion of host data associated with the recovery metadata database;

identify a filesystem metadata database associated with the portion of the host data;

make a second determination, based on the recoverable identifier, that a second host checksum value in the filesystem metadata database does not match the backup checksum value; and request, based on the second determination, the portion of the backup copy.

3. The method of claim 1, wherein the recoverable identifier is a normal identifier, and wherein when the recoverable identifier is the normal identifier the method further comprises:

receiving, from a second host, a request to initiate the recovery operation using the backup copy; and providing, to the second host, the recovery metadata database, wherein the recovery metadata database is usable to:

identify a portion of host data associated with the recovery metadata database;

identify a filesystem metadata database associated with the portion of the host data;

make a second determination, based on the recoverable identifier, that a second host checksum value in the filesystem metadata database does match the backup checksum value; and skip, based on the second determination, a portion of the recovery operation associated with the portion of the backup copy.

4. The method of claim 1, wherein the recoverable identifier is an abnormal identifier, and wherein when the recoverable identifier is the abnormal identifier the method further comprises:

receiving, from a second host, a request to initiate the recovery operation using the backup copy; and providing, to the second host, the recovery metadata database, wherein the recovery metadata database is usable to:

identify a portion of host data associated with the recovery metadata database;

identify a filesystem metadata database associated with the portion of the host data;

make a second determination, based on the recoverable identifier, that the portion of the backup copy is not usable for the recovery operation; and skip, based on the second determination, a portion of the recovery operation associated with the portion of the backup copy.

5. The method of claim 1, the method further comprising:

generating, based on the recoverable identifier, a score card for the backup copy, wherein the score card comprises a total amount of the backup copy that is associated with a normal identifier.

6. The method of claim 1, wherein the recoverable identifier is an abnormal identifier, and wherein when the recoverable identifier is the abnormal identifier the method further comprises:

performing a correction operation on the portion of the backup copy.

7. The method of claim 6, wherein the correction operation comprises requesting, from the host, a second copy of a portion of the backup copy associated with the abnormal identifier.

8. A method for efficient backup and recovery validation, the method comprising:

initiating a backup operation for a host;

identifying, in response to the initiating, a first filesystem that is subject to the backup operation;

retrieving first filesystem metadata associated with the first filesystem;

appending a portion of the first filesystem metadata associated with a portion of the first filesystem with a first host checksum value based on the portion of the first filesystem to generate a backup-ready metadata database;

providing the backup-ready metadata database to a backup storage as part of completing the backup operation;

after completing the backup operation:

initiating a recovery operation for the host;

receiving, after the initiating and from the backup storage, a backup metadata database;

identifying a second filesystem associated with the backup metadata database;

retrieving second filesystem metadata associated with the second filesystem;

making a first comparison, for a first portion of the second filesystem, between a second host checksum value contained within the second filesystem metadata and a backup checksum value contained within the backup metadata database; and making an adjustment, based on the first comparison, to the recovery operation.

9. The method of claim 8, the method further comprising:

making a determination, based on the normal identifier, that the second host checksum value does match the backup checksum value, and wherein the adjustment comprises:

skipping a portion of the recovery operation associated with the second host checksum value.

10. The method of claim 8, the method further comprising:

make a determination, based on the normal identifier, that the second host checksum value does not match the backup checksum value, and wherein the adjustment comprises:

requesting, from the backup storage, a portion of a backup copy associated with the second host checksum value.

11. The method of claim 10, the method further comprising:

making a second determination that the backup metadata database includes an abnormal identifier, and wherein the adjustment further comprises:

skipping a portion of the recovery operation associated with the abnormal identifier.

12. The method of claim 8, wherein the first host checksum value is generated using an integrity stream feature of the first filesystem.

13. A non-transitory computer readable medium (CRM) comprising computer readable program code, which when executed by a computer processor, enables the computer processor to perform a method for efficient backup and recovery validation, the method comprising:

receiving, as part of a backup operation for a host and at a backup storage, a backup copy from the host;

retrieving a metadata database from the backup copy, wherein the metadata database comprises a host checksum value based on a portion of the backup copy;

parsing, using a backup agent, the metadata database by appending the metadata database with a backup checksum value based on the portion of the backup copy;

making a first determination, using the backup agent, whether the portion of the backup copy is abnormal based on a comparison between the host checksum value and the backup checksum value;

appending, based on the first determination, the metadata database with a recoverable identifier to generate a recovery metadata database, wherein the recoverable identifier causes an adjustment to a recovery operation; and generating, based on the recoverable identifier, a score card for the backup copy, wherein the score card comprises a total amount of the backup copy that is associated with a normal identifier.

14. The non-transitory CRM of claim 13, wherein the recoverable identifier is a normal identifier, and wherein when the recoverable identifier is the normal identifier the method further comprises:

receiving, from a second host, a request to initiate the recovery operation using the backup copy; and providing, to the second host, the recovery metadata database, wherein the recovery metadata database is usable to:

identify a portion of host data associated with the recovery metadata database;

identify a filesystem metadata database associated with the portion of the host data;

make a second determination, based on the normal identifier, that a second host checksum value in the filesystem metadata database does not match the backup checksum value; and request, based on the second determination, the portion of the backup copy.

15. The non-transitory CRM of claim 13, wherein the recoverable identifier is a normal identifier, and wherein when the recoverable identifier is the normal identifier the method further comprises:

receiving, from a second host, a request to initiate the recovery operation using the backup copy; and providing, to the second host, the recovery metadata database, wherein the recovery metadata database is usable to:

identify a portion of host data associated with the recovery metadata database;

identify a filesystem metadata database associated with the portion of the host data;

make a second determination, based on the recoverable identifier, that a second host checksum value in the filesystem metadata database does match the backup checksum value; and skip, based on the second determination, a portion of the recovery operation associated with the portion of the backup copy.

16. The non-transitory CRM of claim 13, wherein the recoverable identifier is an abnormal identifier, and wherein when the recoverable identifier is the abnormal identifier the method further comprises:

receiving, from a second host, a request to initiate the recovery operation using the backup copy; and providing, to the second host, the recovery metadata database, wherein the recovery metadata database is usable to:

identify a portion of host data associated with the recovery metadata database;

identify a filesystem metadata database associated with the portion of the host data;

make a second determination, based on the recoverable identifier, that the portion of the backup copy is not usable for the recovery operation; and skip, based on the second determination, a portion of the recovery operation associated with the portion of the backup copy.

17. The non-transitory CRM of claim 13, wherein the host checksum value and the backup checksum value are generated using an integrity stream feature of a filesystem associated with the backup copy.

18. The non-transitory CRM of claim 13, wherein the recoverable identifier is an abnormal identifier, and wherein when the recoverable identifier is the abnormal identifier the method further comprises:

performing a correction operation on the portion of the backup copy.

* * * * *